Inventor
J. VILLIERS

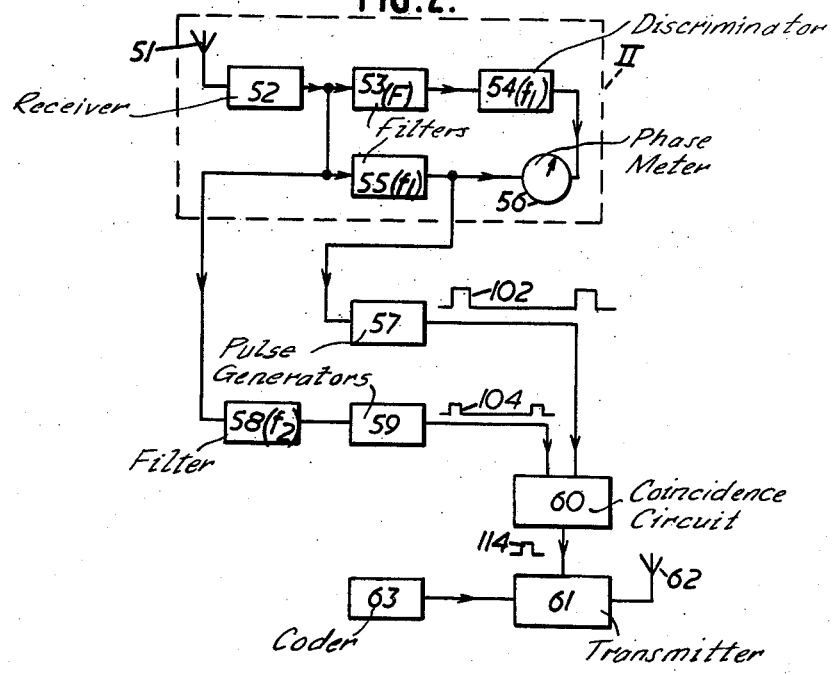
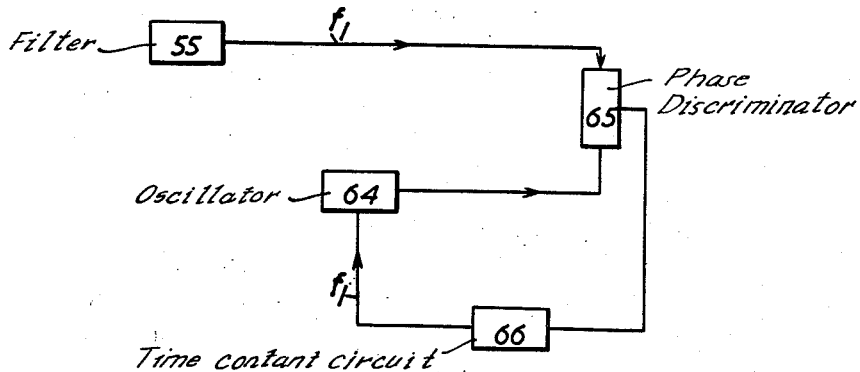

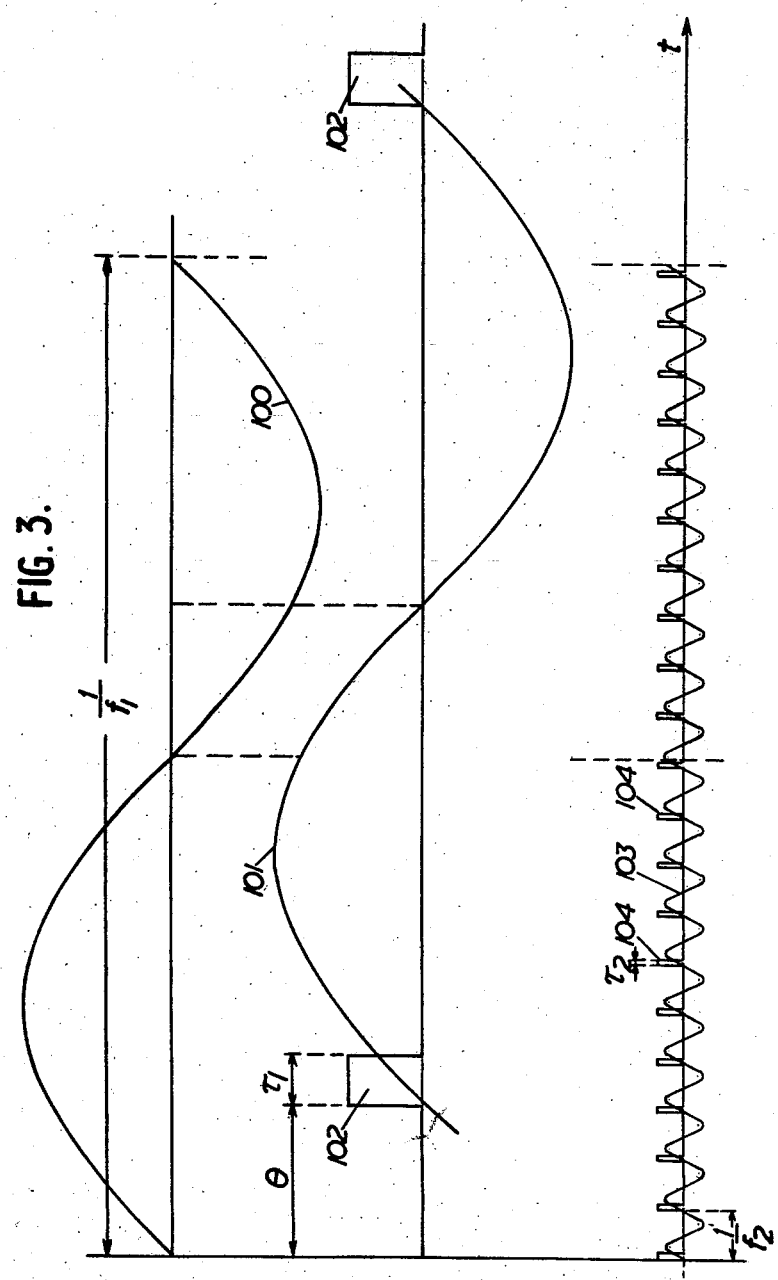

United States Patent Office

3,181,141
Patented Apr. 27, 1965

---

3,181,141
ROTATING RADIO-BEACON SYSTEM FOR LOCATING OBJECTS
Jacques Villiers, Paris, France, assignor to International Standard Electric Corporation, New York, N.Y., a corporation of Delaware
Filed Jan. 18, 1960, Ser. No. 3,171
Claims priority, application France, Jan. 28, 1959, 785,137, Patent 1,226,485
8 Claims. (Cl. 343—6)

This invention refers to a system for locating moving objects by means of a rotating radio-beacon.

Radio-navigation devices are known under the name "rotating radio-beacon" that essentially comprise an antenna system, a transmitter and modulators and that beam two waves. One, called a "reference wave," has an omnidirectional pattern and is modulated directly or through the medium of sub-carrier by a signal of a certain frequency $f_1$. The other, a non-modulated wave, called "information or measuring wave," is transmitted according to a rotary directional pattern, in the form of a cardioid or in a more complex form, which rotates at the rate of $f_1$ revolutions a second.

A suitable receiver borne by the moving object receives the two waves, takes from them respectively a first reference signal at frequency $f_1$, due to the detection of the reference wave's modulating signal, and a second measuring signal at the same frequency $f_1$, due to the detection of the directional measuring wave, which scans the moving object at this same frequency and routes these two signals into two separate channels. Phase displacement between the reference signal and the measuring signal is, at each point in space, equal to the moving object's azimuth (or to a whole multiple of that azimuth) with respect to the rotating radio-beacon. By a phase measurement applied to LF signals the moving object's receiver thus allows determining this azimuth with respect to the rotating beacon's magnetic north.

In systems operating from certain rotating radio-beacons such as the VHF omnidirectional rotating radio-beacons known under the abbreviations VOR (very high frequency omnirange), only the moving object's azimuth can be indicated by the receiver. In other systems, such as the one known as "Tacan," additional devices further allow the moving object to determine the distance between it and the rotating radio-beacon. In the case of both VOR and Tacan, the control station associated with the rotating radio-beacon does not have the means to be simply informed of the moving object's azimuth or distance.

One object of this invention is a rotating radio-beacon locating system that allows a control station associated with the rotating radio-beacon (which can be a station borne by a first moving object) to determine the azimuth and the distance of a second moving object provided with the equipment to be described bleow and possibly to inform said second moving object of its distance (the azimuth continuing to be available on board the second moving object).

Another object is a rotating radio-beacon locating system that allows the control station to receive diverse information (altitude, call-letters, etc.) coming from the second moving object.

Another object is to provide a rotating radio-beacon locating system by means of simple circuits associated with the rotating radio-beacons (VOR or Tacan, for example) and with receivers adapted to operate with these rotating radio-beacons. In particular, the invention's system uses only a single carrier frequency, which is the rotating radio-beacon's frequency, contrary to the systems of the same type already proposed, which provide for the sending by a transmitter associated with the rotating radio-beacon and on a particular carrier wave, of pulses having a predetermined time relationship with the rotation of the directional pattern.

For brevity's sake, the radio locating system of the invention will be termed VORDAR to express the fact that it combines a rotating radio-beacon of the VOR type and locating means equivalent to radar.

According to the invention, the VORDAR system comprises, in addition to the means for beaming the omnidirectional reference wave modulated by a first signal at frequency $f_1$ and the directional-pattern measuring wave rotating at a speed of $f_1$ revolutions per second, additional means for modulating the reference wave by a second signal of appropriate frequency $f_2$, greater than $f_1$, an RF receiver for receiving pulses sent by the moving object and a plan-position cathode-ray tube, or panoramic tube, receiving said pulses and provided with a special scanning device controlled by the first signal at frequency $f_1$ and by pulses taken from the second signal at frequency $f_2$.

The receiver borne by the moving object comprises, in addition to the means for separately picking up the reference signal and the measuring signal and comparing their respective phases, means for taking from the measuring signal at frequency $f_1$ first pulses of length $\pi_1$ and of frequency $f_1$ having a well-defined phase relationship with the measuring signal, means for extracting the second signal at frequency $f_2$ from the reference wave and for taking from said second signal second pulses of length $\pi_2$ and of frequency $f_2$ having a well-defined phase relationship with the second signal, a coincidence circuit producing output pulses when it simultaneously receives at its inputs a first pulse and a second pulse, and an RF transmitter sending these output pulses.

Other circuits and complementary components can be associated with the rotating radio-beacon and with the receiver, as will be seen in what follows.

The invention will now be described in detail with reference to the appended drawing, wherein:

FIG. 2 shows the receiver borne by the moving object, together with its various circuits and its associated transmitter.

FIG. 3 is a signal diagram for explaining the locating system's operation.

FIG. 7 shows added circuits of the receiver of FIG. 2.

Figure 1:
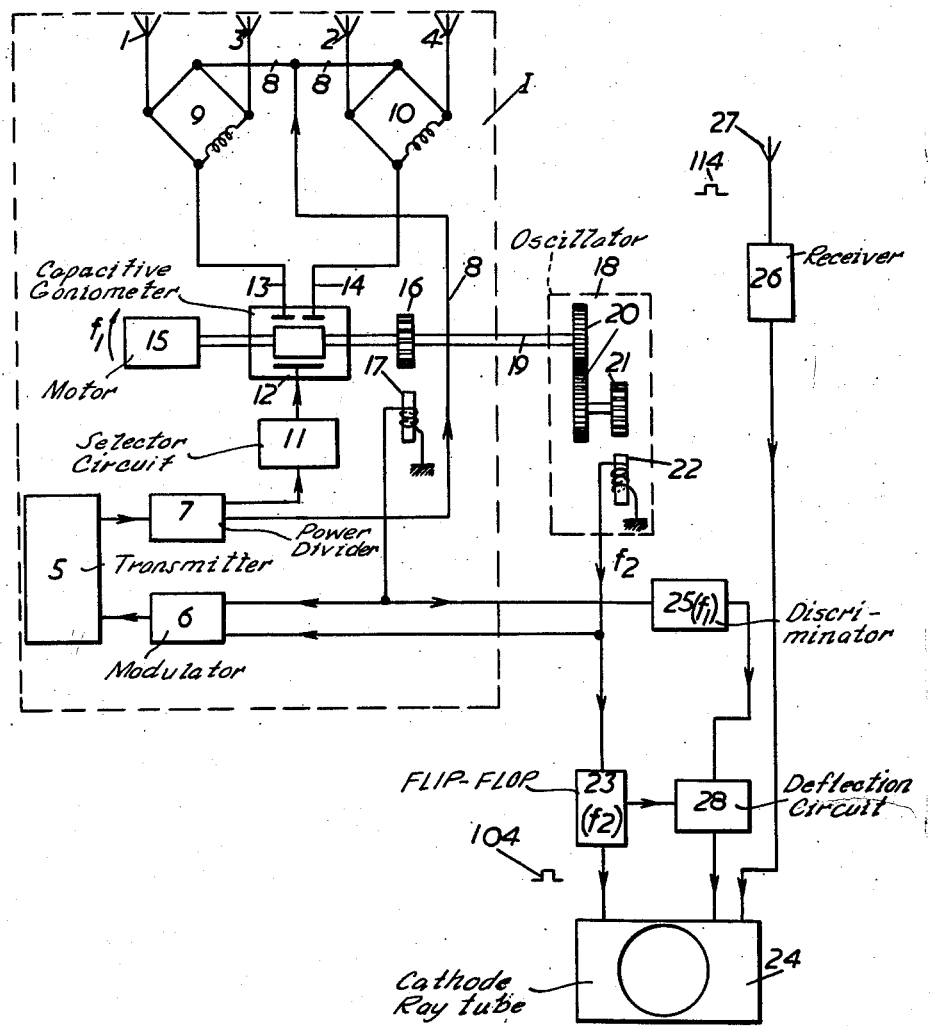
FIG. 1 shows the rotating radio-beacon.

Referring first to FIG. 1, a VOR of standard type, such as those currently used in civil aviation, is shown within the broken lines of box I. It comprises four antennas 1, 2, 3, 4, arranged at the corners of a square, the antennas 1 and 3 and the antennas 2 and 4 being diagonally opposite. These four antennas are supplied (1) in phase by a VHF carrier wave, modulated by a sub-carrier wave at frequency F, itself modulated by a signal at frequency $f_1$, and (2) with suitable respective phases by the same carrier wave, non-modulated. Also transmitted with the standard VOR signal is another sine wave signal $f_2$ phase locked to the 30 c.p.s. VOR reference signal as will be described subsequently. The sub-carrier F is dependent upon the number of teeth on tone wheel 16 and its speed of rotation. The teeth of the wheel 16 have variable spacing to generate in a coil a nominal frequency of F cycles modulated at the $f_1$ rate. The VHF power is produced by a transmitter 5, modulated by a modulator 6. The output of this transmitter is connected to a power divider 7 having two outputs. The first output is connected to power-supply line 8, which supplies the antennas in phase across balanced branches of bridges 9 and 10, by the reference wave doubly modulated at frequencies F and $f_1$. The second output is connected to a selector circuit 11 that serves to eliminate any modulation and to restore the pure carrier wave, then to a capacitive goniometer 12 outgoing from which are the supply lines 13 and 14 that supply the antennas 1–3 and 2–4 across branches of bridge 9 and 10, introducing appropriate fixed phase displacement, e.g. 90°. Capacitive goniometer 12 is made to rotate at an angular velocity of $f_1$ revolutions per second by a motor 15. This motor also drives the tone wheel 16 whose teeth are suitably cut to induce in a coil 17 an A.C. at a frequency F modulated in frequency at frequency $f_1$. This current is applied to modulator 6.

For example, in standard VOR's, the frequencies F=9960 cycles and $f_1$=30 cycles have been selected.

The following steps are taken in order to convert a VOR transmitter into a VORDAR transmitter:

An oscillator 18 is synchronized to VOR frequency $f_1$, producing a signal at frequency $f_2$ such that $f_2$ equals $kf_1$ (where $k$ is an improper fraciton).

All known means for synchronizing an oscillator to frequency $f_2$ by the VOR's portion producing the signal at frequency $f_1$ can be used. For example, it is possible to connect, on shaft 19 of motor 15, which drives capacitive goniometer 12 and tone wheel 16 at an angular velocity of $f_1$ revolutions a second gear 20 (or a friction transmission device) of ratio $r$ whose outgoing shaft drives a tone wheel 21 comprising $d$ teeth regularly spaced and so profiled that they generate in a magnetic pick-up 22 a sinusoidal signal at the frequency $f_2 = rf_1 d$. It is also possible to take, as will be shown in what follows (with $f_1$=30 cycles):

$$r = \frac{301}{300} \text{ and } d=20 \text{ or } k=rd=\frac{301}{15}$$

whence $f_2$=602 cycles.

The signal at frequency $f_2$ is applied (1) to modulator 6 and (2) to a pulse generator such as flip-flop circuit 23. The output of flip-flop circuit 23 is connected to the scanning device of plan-position cathode-ray tube 24, to produce a radial beam deflection. The scanning device also receives a special signal produced by a circuit 28 to produce a modified circular deflection and the pulses produced by the moving object and received by antenna 27 and receiver 26 to vary the beam brightness. This circuit 28, which will be explained later, receives from discriminator 25 reference signal 100 (FIG. 3) at frequency $f_1$, as well as pulses 104 produced by flip-flop circuit 23. Its purpose is to convert signal 100 into a staggered signal.

Referring now to FIG. 2, within the broken lines of box II is shown a VHF receiver of the classic type designed to furnish the moving object bearing it with the azimuth of said moving object with respect to the VOR. This receiver comprises an antenna 51, a receiver properly so-called 52, connected (1) to a band filter 53 having a center frequency equal to F, followed by a frequency discriminator 54 producing the reference signal at frequency $f_1$, and (2) to a low-pass filter 55 producing the measuring signal at frequency $f_1$ generated by the rotation of the cardioid pattern. The two channels in which the reference signal and the measuring signal are respectively obtained are connected to a phase meter 56, which furnishes the moving object's azimuth, as is known.

In order to convert a VOR receiver into a VORDAR receiver, the output of filter 55 of the measuring channel is connected to a pulse generator 57, for example a Schmitt flip-flop, which produces a pulse 102 (FIG. 3) of length $\tau_1$ each time sinusoidal signal 101, respresenting the measuring signal at frequency $f_1$, passes through zero in a given direction, for example through positive values. This pulse is equivalent to the pulse that would be produced at the receiver's output if antenna 51 were scanned by a beam of width $d\theta$ rotating at the same speed as the cardioid pattern, the quantity $d\theta$ being bound up with $\tau_1$ by the equation:

$$d\theta_{\text{degrees}} = f_1 \times 360 \tau_1$$

$\tau_1$ being expressed in seconds. For example, if $\tau_1$ is made equal to 110 microseconds and $f_1$ is given the value already proposed, the aperture of the equivalent beam will be 1.2°.

Furthermore, the output of receiver 52 is connected to a band filter 58 whose center frequency is $f_2$ and which is itself connected to a pulse generator 59, of the same type as circuit 57, for example, generator 59 producing a pulse 104 of length $\tau_2$ each time sinusoid 103, representing the signal at frequency $f_2$, passes through zero in a given direction, through positive values, for example. Length $\tau_2$ seconds represents a radial distance of $$300{,}000 \frac{\tau_2}{2} \text{ kilometers}$$

The shorter the width of the pulse 104, the better is the distance resolution.

The outputs of pulse generators 57 and 59 are connected to an "and" type coincidence circuit 60 that produces a well-defined pulse 114 of length $\tau_3$ with each coincidence of a pulse 102 and a pulse 104. Such coincidence circuits are well known to the art and can be made up, for example, of a multi-control grid electron tube or of a set of diodes. It is this pulse 114 that is received by receiver 26 of FIG. 1.

Coincidence circuit 60 serves to unblock a VHF transmitter 61 connected to an antenna 62. This transmitter also receives from a coder 63 information intended to be transmitted during the length of pulse 114. This information, made up of a signal formed from coded pulses, for example, can represent the altitude of a moving object or its call letters. The rapidity of the scanning rate and the persistence of the cathode-ray tube screen insures that repeated pulses from the same aircraft at the same altitude will be indicated on the cathode tube screen at the specific altitude level so long as that aircraft remains at that altitude.

FIG. 3 shows at 100 the sinusoidal reference signal at frequency $f_1$ obtained at the output of frequency discriminator 54, at 101 the signal obtained at the output of filter 55 when the moving object is on a given azimuth $\theta$, at 102 the pulses of length $\tau_1$ taken from signal 101 by pulse generator 57, at 103 the sinusoidal signal at frequency $f_2$ and at 104 the pulses of length $\tau_2$ taken from signal 103 by pulse generator 59.

Figure 4:
FIGS. 4 and 5 are geometric diagrams for explaining the areolar character of the space scanning used in the locating system.

The points in space that are scanned at a given instant $t$ are those at which there is coincidence of pulses 102 and 104. Pulses 104 define circular crowns 105 (FIG. 4) with a width of $$dp = 300{,}000 \frac{\tau_2}{2}$$

The place of the points that simultaneously receive the $\tau_1$ and $\tau_2$ pulses are sectors 106 of aperture $d\theta$. In effect, it can be seen that if coincidence exists at a point A of beam 107 in a time $t$, it will then be reproduced at every point of beam 107, the pulses $\tau_1$ and $\tau_2$ (or more accurately, the modulations at frequencies $f_1$ and $f_2$, from which the pulses are formed in the receiver) are propagated at a speed equal to the speed of electromagnetic waves. The angular resolution is $d\theta$; the distance resolution is $dp$.

If $f_2$ is a whole multiple $q$ of $f_1$, for example $$f_1 = 30 \text{ cycles}$$
$$f_2 = 600 \text{ cycles} \qquad q=20$$

the points in space that are scanned are distributed among 20 equally-spaced beams (or rather among 20 equally-spaced sectors of aperture $d\theta$), that is, spaced $$\frac{360}{20} = 18°$$

These beams or sectors will be designated (see FIG. 5) by the notation $R_{m/n}$, where $m$ indicates that the beam is generated in the course of the $m$th rotation of the cardioid.

$n$ indicates the rank of the beam ($n$ comprised between 1 and $q$, and in the example between 1 and 20).

Figure 5:
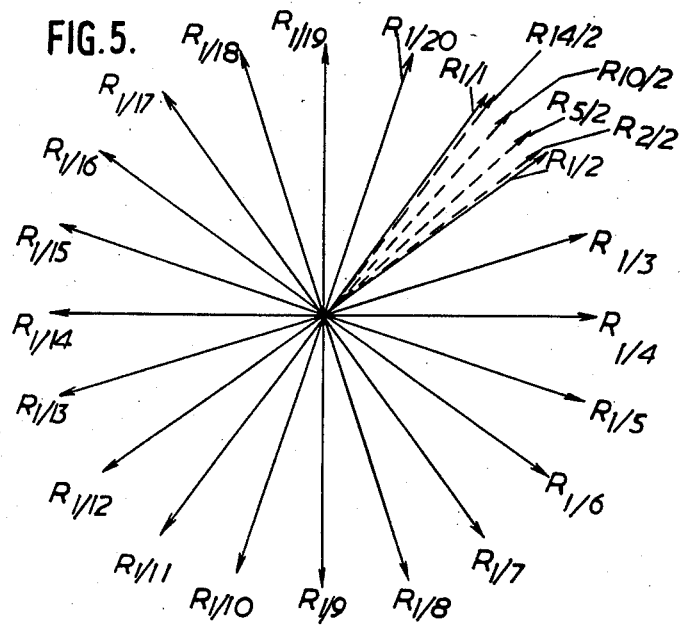

FIG. 5 shows the 20 beams $R_{1/1}$ to $R_{1/20}$ generated during the cardioid's first rotation. During the cardioid's next rotation it is clear that beams $R_{2/1}$ to $R_{2/20}$ will be applied respectively to their homologous beams $R_{1/1}$ to $R_{1/20}$.

Since it is desirable to explore all points in space, it would be advisable, in the hypothesis under consideration, to adopt a large value for $d\theta$ ($d\theta \geqq 18°$) but this would deprive the system of any practical interest. In order to explore all points in space and still maintain a suitable separating power, $f_2$ is given a value slightly different from a harmonic of $f_1$, that is, in this case a value slightly different from the harmonic 20. Assuming that $f_2 = (20 + \epsilon)30$, whence $k = q + \epsilon$, it is found (FIG. 5) that beam $R_{2/n}$ is no longer applied to its homologous beam $R_{1/n}$ of the preceding revolution. Actually, the angle between two consecutive beams of the same revolution is $$\frac{2\pi}{20+\epsilon}$$

The beams $R_{2/n}$ and $R_{1/n}$ are shifted with respect to each other by an angle $$\omega = 2\pi - 20 \times \frac{2\pi}{20+\epsilon} = 2\pi \frac{\epsilon}{20+\epsilon}$$

The result is that beam $R_{2/n}$ is shifted on beam $R_{1/n}$ by $\omega$, beam $R_{3/n}$ is shifted on beam $R_{1/n}$ by $2\omega$, etc., and beam $R_{p/n}$ will be applied to beam $R_{1/n-1}$ if $$p\omega = \frac{2\pi}{20+\epsilon} \text{ or } 2\pi \frac{\epsilon}{20+\epsilon} \times p = \frac{2\pi}{20+\epsilon} \text{ or } p\epsilon = 1$$

Thus, at the end of $p$ revolutions, $20p$ regularly spaced beams will have been scanned and no longer 20 beams as in the case where $f_2 = 20f_1$. Each beam is no longer scanned every $1/f_1$ second but every $p/f_1$ second.

The number $p$ can be chosen at will. However, it is so chosen that it will lead to whole values for $f_2$. Assuming that $$p = 15$$

then $$f_2 = 602 \text{ cycles} \quad \left(\epsilon = \frac{1}{p} = \frac{1}{51}\right)$$

The spacing between two beams $R_{m/n}$ and $R_{m+1/n}$ is $\omega = 1.2°$.

The complete scanning cycle of the plan takes $$\frac{15}{30} = 0.5 \text{ second}$$

Figure 6:
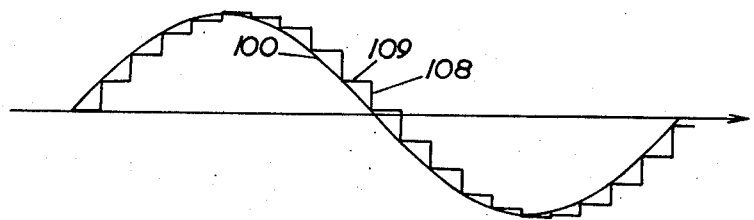
FIG. 6 shows the shape of the scanning signals of the plan-position cathode-ray tube.

All points of the plan will be effectively scanned if a separating power of $d\theta \geqq \omega$ is chosen. Actually, overlapping of adjacent sectors is provided by making $d\theta$ substantially greater than $\omega$ (FIG. 6).

As described above, a standard VOR signal is transmitted by a ground beacon; added to this signal is a 602 c.p.s. sine wave. This additional sine wave is phase locked to the 30 c.p.s. VOR reference signal such that the two frequencies maintain an exact 30:602 ratio. This can be conveniently accomplished by the use of a common frequency controlling source such at the goniometer drive shaft as illustrated. In the aircraft or moving object, the standard VOR equipment receives the 30 and 602 c.p.s. signals. The aircraft receiver operates normally to provide bearing information and also performs the following functions. It detects the zero crossing of the 30 c.p.s. variable phase VOR signal and generates a gate (approximately 110μs.) starting at the zero crossing. It detects the zero crossing of the 602 c.p.s. signal and generates a trigger pulse starting at the zero crossing. The 30 c.p.s. gate and the 602 c.p.s. pulse train are then compared for coincidence and when this occurs, a trigger pulse 114 is generated. This pulse is transmitted to the ground beacon where it is received and displayed in a PPI presentation.

The gated pulse obtained in the aircraft and transmitted to the ground beacon provides both distance and bearing information for the PPI display. For example, at time $t = 0$ the zero crossings of the 602 c.p.s. signal and the 30 c.p.s. variable signal are coincident only at bearing zero degrees and, consequently, any replies received from this cycle of the 602 c.p.s. signal are known to originate from aircraft which are at zero degrees bearing. The distance of an aircraft from the VORDAR ground beacon is measured by the time delay from the ground transmission of the zero crossing of the 602 sine wave to receipt of reply pulse.

Similarly, at time $t = 0.00166$ second (one cycle at 602 c.p.s.) the next zero crossing of the 602 c.p.s. signal is transmitted from the ground beacon. By this time, the 30 c.p.s. zero crossing has moved 17.94 degrees in bearing (in the air and on the PPI) so that replies received for that timing cycle must originate at aircraft in a narrow sector near that bearing. Similarly, for each succeeding cycle of the 602 c.p.s. signal, replies will be received from aircraft at bearings which are integral multiples of 17.94 degrees.

The frequency of 602 c.p.s. is used to achieve stroboscopic progression of the PPI sweep. By using a 602 c.p.s., it requires 301 cycles of the 602 c.p.s. signal (15 cycles of the 30 c.p.s. variable signal) before repeating and a resolution of 360°/301 or 1.196 degrees is obtained. For example, the 21st cycle of the 602 c.p.s. begins (crosses zero) at $t = 0.03322$ second, corresponding to 358.804 degrees at 30 c.p.s., 1.196 degrees from the zero degrees of the 1st cycle of the 602 c.p.s. Similarly, each succeeding cycle of the 602 c.p.s. begins at a bearing (phase) of the 30 c.p.s. variable signal 1.196 degrees earlier than the 20th preceding cycle of the 602 c.p.s. If, instead of 602 c.p.s., another frequency were chosen, a different degree of resolution and/or a different data rate would be obtained.

Due to the high rotating speed of beam 107, precautions must be taken to prevent distortion of the plan position resulting from the fact that the beam has turned through an appreciable angle between the moment the pulses of close moving objects and the pulses of far moving objects arrive, for a predetermined azimuth.

In order to prevent such distortion, scanning must be stopped 602 times a second, or, more generally, every $1/f_2$ second, at the position it had the moment sinusoid 103 passes through zero through positive values.

The radial deflection signals are sawteeth taken from the pulses 104 produced by flip-flop circuit 23.

As for angular deflection, instead of applying signal 100, produced by discriminator 25, to the corresponding deflection device of cathode-ray tube 24, this signal is converted into a more complex signal 108 (FIG. 6), obtained by creating steps 109 on signal 100, broken off at the rate of the pulses 104 obtained from flip-flop circuit 23.

Circuits that allow going from a continuous signal to a staggered signal, staggering at recurrent instants, are known to the art. They generally comprise sampling circuits that allow obtaining recurrent sampling pulses and pulse-time converting circuits that convert the sampling pulses into pulses that are as long as their recurrence period.

Due to interference between the waves directly beamed by the radio-beacon and the waves reflected by obstacles, the signal at frequency $f_1$ taken from filter 55 (FIG. 2) is generally not stable in phase. That is why phase meter 56 (FIG. 2) must be given a time constant of the order of a fraction of a second.

The device of FIG. 7 makes it possible to give the phase of the signal at frequency $f_1$ the desired stabilization. An oscillator 64 at frequency $f_1$ is locked in phase with a signal at frequency $f_1$ sent out from filter 55 through the medium of a phase discriminator 65 delivering a signal of suitable direction through time-constant circuit 66. In order to facilitate the control of oscillator 64, it can be replaced with two oscillators at higher frequency whose beat is at frequency $f_1$.

There are two possible ways of transmitting call-letters:

(a) Modulation in $A_2$ with F as sub-carrier.
(b) Cyclical interruption of the F transmission and transmission of the call letters. The signals of the plan-position indicator retain their image during the time the call letters are sent.

What is claimed is:

1. An omnirange beacon system having means for transmitting first continuous wave rotating direction indicating signals at a first frequency in a radiation pattern from which azimuth indications can be produced on a craft, further comprising a generator for producing continuous wave second signals at a frequency higher than said first frequency, means for transmitting said second signals substantially omni-directionally from said beacon, an indicating device at said beacon synchronized with said second signals, means on said craft for generating and transmitting other signals in response to received first and second signals at the time said beacon is aligned in a predetermined manner with respect to said craft, and means at said beacon responsive to said other signals from said craft to produce on said device an indication of the location of said craft relative said beacon.

2. An omnirange beacon system according to claim 1 wherein said craft further comprises means for separating said direction indicating signals and said second signals, means for producing gating pulses in response to a predetermined condition of said direction indicating signals, a transmitter, a gating circuit coupled to said transmitter, means for producing pulse signals from said second signals, means for applying said pulse signals to said gating circuit, and means for applying said gating pulses to said gating circuit to effect transmission of said other signals occurring during the time of said gating pulses.

3. An omnirange beacon having means for transmitting a rotating directive radiation pattern and an arrangement for transmitting first continuous wave reference signals having a phase dependent upon said directive radiation pattern pointing in a particular reference direction so that azimuth indications can be produced on a craft by comparison of the wave produced by the directional rotation of the pattern and the reference signal, comprising a generator for producing continuous wave second signals, means for transmitting said second signals substantially omnidirectionally from said beacon, said second signals having a frequency higher than that of said reference signals, an indicating device at said beacon synchronized with said generator, means at said beacon responsive to other signals derived from the received directional radiation wave and said second signals and transmitted from said craft for producing an indication on said indicating device of the location of said craft with respect to said beacon.

4. An omnirange beacon system having means for transmitting a rotating directive radiation pattern to provide a variable envelope signal wave of a predetermined frequency and an arrangement for transmitting first continuous wave reference signals of said predetermined frequency having an original corresponding to a particular reference direction of said directive pattern so that azimuth indications can be produced on a craft by comparison of said envelope signal wave and said reference signal, comprising a generator for producing continuous wave second signals at a frequency higher than said reference signals, means for transmitting said second signals substantially omni-directionally from said beacon, an indicating device at said beacon synchronized with said second signals, means on said craft for deriving other signals in response to the received energy of said envelope signal wave at a predetermined phase position thereof and said second signals, means for transmitting said other signals and means at said beacon responsive to said other signals for producing an indication on said device of the distance and bearing of said craft relative said beacon.

5. An omnirange beacon system according to claim 4, wherein said craft comprises means for separating said variable signal wave, said reference signals, and said second signals, means for producing gating pulses in response to a predetermined amplitude condition of said variable signal wave, means for deriving pulses from said second signals corresponding to each cycle thereof, a gating circuit, means for applying said gating pulses and said derived pulses to said gating circuit to render it conductive in response to both signals occurring simultaneously, a transmitter, and means for rendering said transmitter operative in response to conductivity of said gating circuit.

6. An omnirange beacon system having means for transmitting a rotating directive radiation pattern and an arrangement for transmitting first continuous wave reference signals of the same frequency as the envelope frequency derived from the rotation of said pattern so that azimuth indications can be produced on a craft by phase comparison of the wave produced by the directional rotation of the pattern and the reference signal, comprising a generator for producing continuous wave second signals, means for transmitting said second signals substantially omni-directionally from said beacon, said second signals being at a frequency higher than that of said reference signal frequency, an oscilloscope indicating device at said beacon synchronized with said reference frequency to produce a rotary deflection of the beam of said device, and a radial deflection of said beam synchronized with said generator, means on said craft for deriving other signals in response to received energy at the time said beacon is aligned in a predetermined phase relation with respect to said craft and means at said beacon responsive to said other signals for producing a brightness variation of said beam to provide an indication of the distance and angular position of said craft with respect to said beacon.

7. An omnirange beacon system according to claim 6 wherein said indicating device comprises a flip-flop circuit, means for applying said generated second signals to said flip-flop circuit to produce a series of pulses, means for applying said pulses to said oscilloscope to produce the radial deflection of said beam, a further circuit for generating circular deflection waves, means for applying said reference waves to said further circuit to synchronize it, and means for applying said pulses to said further circuit to modify the circular deflection of said beam.

8. An omnirange beacon system according to claim 6 wherein said envelope frequency is $f_1$, said second signals have a frequency $f_2$ and the ratio of said envelope frequency to said second signals is $f_1/f_2$ where $f_2$ is not a harmonic of $f_1$ and means for synchronizing the signal frequency $f_1$ to the signal frequency $f_2$ so that when a complete scanning cycle is effected a whole number of signals of $f_1$ and $f_2$ are completed.

References Cited by the Examiner

UNITED STATES PATENTS

| 2,666,198 | 1/54 | Wallace | 343—106 |
| 2,705,793 | 4/55 | Litchford | 343—106 |
| 2,804,615 | 8/57 | Weihe | 343—106 |
| 2,864,080 | 12/58 | Rodgers | 343—106 |
| 2,889,551 | 6/59 | Pickles et al. | 343—106 |
| 2,890,449 | 6/59 | Pickles et al. | 343—106 |
| 2,954,554 | 9/60 | Feltham | 343—17.1 |

CHESTER L. JUSTUS, *Primary Examiner.*